United States Patent [19]

Temple

[11] 4,455,343

[45] Jun. 19, 1984

[54] AQUEOUS TREATING COMPOSITION FOR GLASS FIBER STRANDS USED TO PRODUCE MATS FOR THERMOPLASTICS

[75] Inventor: Chester S. Temple, McKees Rocks, Pa.

[73] Assignee: PPG Industries, Inc., Pittsburgh, Pa.

[21] Appl. No.: 220,349

[22] Filed: Dec. 29, 1980

[51] Int. Cl.$^3$ ............................................. B32B 15/00
[52] U.S. Cl. .................................... 428/285; 428/300; 428/391; 428/429; 427/212; 524/265; 525/106
[58] Field of Search ............... 525/106; 428/391, 429, 428/285, 300; 524/265; 427/212

[56] References Cited

U.S. PATENT DOCUMENTS

| | | | |
|---|---|---|---|
| 3,168,389 | 2/1965 | Eilerman | 65/3.41 |
| 3,437,517 | 4/1969 | Eilerman et al. | 428/392 |
| 3,484,223 | 12/1969 | Vanderbilt et al. | 65/3.44 |
| 3,556,754 | 1/1971 | Marsden et al. | 525/106 |
| 3,849,148 | 11/1974 | Temple | 106/287.15 |
| 3,940,357 | 2/1976 | Fahey | 524/417 |
| 3,944,707 | 3/1976 | Foley et al. | 428/391 |
| 4,029,623 | 6/1977 | Maaghul | 260/29.6 RW |
| 4,196,273 | 4/1980 | Imai et al. | 428/429 |

Primary Examiner—Joseph L. Schofer
Assistant Examiner—N. Sarofim
Attorney, Agent, or Firm—Kenneth J. Stachel

[57] ABSTRACT

An aqueous treating composition, treated glass fiber strands and glass fiber strand mat formed therefrom is provided that enables the production of glass fiber mat reinforced thermoplastic polymers having improved stampability. The aqueous treating composition has a combination of organic silane coupling agents, where one is a vinyl-containing organic silane coupling agent and the other is a saturated amino-organic silane coupling agent. The amino silane coupling agent is present in an amount in the range of about 1 to about 40 weight percent and the vinyl-containing organic silane is present in an amount in the range of about 60 to about 99 weight percent, both amounts based on the amount of the combined silane coupling agents. The combined amount of the silane coupling agents is in the range of about 0.5 to about 10 weight percent of the aqueous treating composition. In addition there is present a heat stable organic peroxide, a glass fiber lubricant and a nonionic surfactant. Optionally a film forming polymer and/or a softening agent can also be incorporated into the aqueous treating composition. Glass fiber strands treated with the aqueous treating composition can be processed into a continuous glass fiber strand mat that is needled and used to reinforce thermoplastic polymers such as polyolefins, polyamides, and polyalkylene terephthalates.

30 Claims, No Drawings

AQUEOUS TREATING COMPOSITION FOR GLASS FIBER STRANDS USED TO PRODUCE MATS FOR THERMOPLASTICS

The present invention is directed to an aqueous treating composition for treating glass fiber strands used to produce mats of glass fiber strands for reinforcing polymeric materials. This invention is also directed to the treated strands, mats and mat reinforced polymeric material.

More particularly the present invention is directed to the use of treated glass fiber strands to produce a mat, and the mat itself, having good stamping performance when used in a composite with a thermoplastic polymeric material.

Glass fibers that are produced by rapid attenuation of many filaments of molten glass issuing from orifices in a bushing of a glass batch melting furnace are gathered during this forming process to produce strands. These glass fiber strands in continuous or chopped form have been used to reinforce thermoplastic polymeric materials. In addition, the strands in either continuous or chopped form can be used to produce mats of glass fiber strands, where the mats are used to reinforce thermoplastic polymeric materials.

In using chopped glass fiber strands, continuous glass fiber strands or mats of either to reinforce thermoplastic polymeric materials the absence of effective coupling between the surface of the glass and the polymer matrix leads to a low level of adhesion between the two, which may result in separation under stress. The art has provided effective coupling between the surface of the glass and the polymeric matrix by the use of specific chemical additives in the sizing composition on the glass fibers. The sizing composition is applied to the glass fibers during the process of forming the glass fibers and producing the glass fiber strands. The sizing composition is typically applied to the glass fibers as they are being attenuated from the small orifices in the bushing and before they are gathered into strands and collected as either chopped glass fiber strands or continuous glass fiber strands. The sizing composition provides protection for the glass fibers from interfilament abrasion and makes the glass compatible with the polymeric matrix. Typically sizing compositions are aqueous compositions having film formers, coupling agents and lubricants.

Where the glass fiber strands having the dried residue of an aqueous treating composition are to be used either as chopped strands or continuous strands in the formation of a mat to be used as reinforcement for polymeric materials, it is important that the mat be so constructed that the polymeric material can adequately penetrate the mat. In addition, the mat must be constructed to enable adequate curing of the polymeric material or between chemicals in the size residue and the polymeric material. Also the glass mat must have a degree of flowability to allow the glass mat and thermoplastic polymeric laminate to fill a mold in a stamping press in a near homogenous manner to reduce void spaces in the stamped article. Mats formed from glass fiber strands having the dried residue of an aqueous treating composition known in the art do not have the best construction to meet these requirements.

An example of an aqueous treating composition used to treat glass fibers used to produce chopped glass fiber strands for use in reinforcing thermoplastic resins systems was disclosed in U.S. Pat. No. 3,882,068 (Swartz). The aqueous sizing composition had 2 to 30 percent by weight of a polyolefin emulsion, a coupling agent in an amount of 0.01 to 2.5 percent by weight and a balance of water. An example of an aqueous sizing composition used to treat glass fiber strands used to reinforce polyolefins was disclosed in U.S. Pat. No. 3,849,148 (Temple). In this patent it was disclosed that the sizing composition had a coupling agent, a heat stable organic peroxide, a nonionic surfactant and a lubricant. Optionally the sizing composition could also have a film forming material. In U.S. patent application Ser. No. 935,275 (Temple) assigned to the assignee of the present application there is disclosed a sizing composition used on glass fiber strands to reinforce polyolefins having a coupling agent, stabilizer, lubricant such as an emulsion of a maleonated amorphous polypropylene, noncrosslinkable film former, softener and surfactant.

In these latter two disclosures the glass fiber strand having the dried residue of the aqueous sizing composition could be used in the form of continuous strand mat that was needled to reinforce the polymeric matrices. Such an operation involved having a plurality of needles with barbs such as a typical loom needles repetitively enter and leave the mat as the mat passes the plurality of needles. This needling operation causes a degree of breakage of the glass fiber strands and the fibers within strands. This type of mat must also have a proper construction to allow for impregnation of the polymeric material throughout the mat and to allow for proper curing and/or heating of the polymeric materials in contact with the mat when the mat and polymeric matrix are combined.

It is an object of the present invention to provide an aqueous treating composition for glass fibers to enable the treated glass fiber strands to form a mat having improved construction for thermoplastic polymer reinforcement.

It is another additional object of the present invention to provide the treated glass fiber strands to be used in producing a mat having improved construction for thermoplastic polymeric reinforcement.

It is a further additional object of the present invention to provide different types of mats of treated glass fiber strands, where the mat has improved construction for thermoplastic polymeric reinforcement.

A further additional object of the present invention is to provide a composite of a mat of glass fiber strand having improved construction with thermoplastic polymeric material, where the improved construction of the mat allows for good impregnation of the mat by the thermoplastic polymeric material and improved curing and/or heating of the thermoplastic polymeric material in the composite to enable the production of a stamped composite articles.

Another further additional object of the present invention is to provide a composite article having a needled mat of continuous glass fiber strands having an improved construction for use with thermoplastic polymeric materials to produce an article of the thermoplastic polymer and needled mat where the composite has improved stamping performance.

SUMMARY OF THE INVENTION

The aforementioned objects and other objects derivable from the following disclosure are accomplished by the present invention which involves the partial substitution of a saturated amino silane coupling agent for a vinyl-containing silane coupling agent in an aqueous treating composition for glass fibers having the vinyl-containing silane coupling agent; nonionic surfactant; glass fiber lubricant; and heat stable, organic peroxide, free radical initiator and water.

The aqueous treating composition for glass fibers has: about 0.5 to about 10 percent by weight of a coupling agent mixture of a vinyl-containing organic silane coupling agent in an amount of about 60 weight percent to about 99 weight percent of the coupling agent mixture and a saturated, amino, organic-silane coupling agent present in an amount of about 1 to about 40 weight percent of the coupling agent mixture, 0.1 to about 7.6 percent by weight of a nonionic surfactant, about 0.001 to about 1 percent by weight of a glass fiber lubricant and about 0.1 to 6 percent by weight of a heat stable, organic peroxide, free radical initiator. Optionally the aqueous treating composition can include a polymeric film forming agent that is conventionally added to aqueous compositions for treating glass fibers.

In the process of partially substituting a saturated amino silane coupling agent for the vinyl-containing organic silane coupling agent the two silane coupling agents can be combined before addition to the other components in the aqueous treating composition or can be added separately or simultaneously to the aqueous treating composition.

DETAILED DESCRIPTION OF THE INVENTION

When mats of glass fiber strands are used to reinforce thermoplastic materials, nonexclusive examples of which are polyolefins, polyamides, such as nylon, polyalkylene terephthalates and the like, the polymeric materials are combined with the mat at an elevated temperature and pressure to make a composite. For the best composite it is desired that the polymeric material impregnate the mat to a very high degree. This enables intimate contact between the glass fibers and strands within the mat with the polymeric material. Such a composite is then heated and stamped into molded articles. During the stamping operation the polymer in the composite and the glass fiber reinforcement must be free to flow to conform to the shape of the mold in the stamping press. For improved stampability and more efficient stamping and the production of a better stamped article, the loft of the glass fiber strand mat within the composite can not be too high or it will cause nonhomogenous flow of the thermoplastic polymer in the mold and cause nonhomogenous heating of the thermoplastic polymer either before being placed in the mold or while in the mold. The latter could result in degradation of some of the surface polymeric material or, in inadequate heating of some of the polymeric material at the center of the composite. If the loft of the glass fiber strand mat is too low, the composite of mat and thermoplastic polymer may have poor physical properties due to the lack of the highest degree of impregnation of the thermoplastic polymer into the mat. Other advantages of a lofty glass fiber strand mat are detailed in U.S. Pat. No. 3,621,092 (Hofer) hereby incorporated by reference.

Improved stampability of the glass fiber mat reinforced thermoplastic polymeric composite is accomplished by using the aqueous composition of the present invention for treating glass fibers during the formation of glass fiber strands. The aqueous treating composition of the present invention has a vinyl-containing silane; an nonionic surfactant; glass fiber lubricant; and heat stable, organic peroxide, free radical initiator in types and amounts as disclosed in U.S. Pat. No. 3,849,148 (Temple) hereby incorporated by reference.

A saturated amino-organic-silane coupling agent is partially substituted for the vinyl-containing organic silane coupling agent that is used in an amount of 0.5 to about 10 percent by weight in U.S. Pat. No. 3,849,148. This partial substitution gives a total amount of organic silane coupling agent present in the aqueous treating composition in the range of about 0.5 to about 10 percent by weight of the aqueous treating composition. The partial substitution results in a mixture of the silane coupling agents, wherein the vinyl-containing organic silane coupling agent is present in an amount of about 60 to about 99 weight percent of the combined silane coupling agents and the saturated amino-organic silane coupling agent is present in the combination of silane coupling agents in an amount of about 1 to about 40 weight percent. The vinyl-containing silane coupling agent can be a vinyl-tris-beta methoxyethoxy (silane) vinyl triethoxysilane, gamma methacryloxypropyl trimethoxysilane, vinyl triacetoxysilane, or acrylate salt of gamma amino propyl triethoxysilane. The saturated amino-silane coupling agent can be gamma aminopropyl triethoxysilane, N-beta(amino ethyl) gamma amino propyl trimethoxysilane, and the amino functional silane having the structural formula

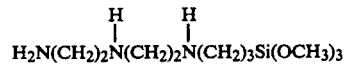

The aforementioned vinyl-containing silane coupling agent and saturated amino silane coupling agent include their partial and full hydrolysis products and polymerization products. A particularly useful vinyl-containing silane coupling agent is the vinyl tris (2-methoxyethoxy) silane available from Union Carbide Corp. under the trade designation A-172. A particularly useful saturated amino organic silane coupling agent is gamma amino propyl triethoxysilane available from Union Caribde Corp. under the trade designation A-1100. The vinyl-containing organic silane coupling agent and saturated amino-organic silane coupling agent can be added to the aqueous treating composition simultaneously or separately or in a mixture. In general the amount of the vinyl-containing organic silane coupling agent can vary in a range from about 2.5 to about 9.9 weight percent of the aqueous treating composition. The amount of saturated amino-organic silane coupling agent generally present in the aqueous treating composition ranges from about 0.005 to about 4 weight percent of the aqueous treating composition.

In addition to the combination of the vinyl-containing organic silane coupling agent and saturated amino-organic silane coupling agent, the aqueous treating composition generally has the glass fiber lubricant, heat stable organic peroxide, and nonionic surfactant in the same types and amounts as in U.S. Pat. No. 3,849,148. It is preferred that the amount of the nonionic surfactant must be at least 0.125 weight percent of the aqueous treating composition. The amount of the nonionic surfactant can be as much as about 7.6 weight percent of the aqueous treating composition.

In addition to these components in the aqueous treating composition there may be and preferably is present a film-forming polymer. Non-exclusive examples of film-forming polymers include polyvinylalcohol, polyvinylacetate, polyvinylpyrrolidone, polyvinylacetate copolymers such as vinylacetate-metholacryl-amide copolymer. The amount of the film forming polymer used is generally in the range of about 0.5 to about 15 weight percent of the aqueous treating composition. Also a softening agent may be added that softens the strand, modifies drape, decreases scroopiness of the fibers and contributes lubricity such that the fibers and strands may be successfully needled in the mat without excessive fiber breakage. Also, in addition to the types of surfactants used in U.S. Pat. No. 3,849,148, the surfactant can be those that act as wetting agents, emulsifiers and detergents to maintain the aqueous treating composition as an emulsion and prevent buildup of the solids on the applicator apparatus when the aqueous treating composition is applied to the glass fibers. Among suitable surfactants are condensates formed by condensing propyleneoxide and propylene glycol such as those disclosed in U.S. Pat. No. 2,674,619. Particularly suitable surfactants are those condensates having a molecular weight of about 150 to 2000 and between 70 and 80 percent by weight of the poly(oxyethylene) in the molecule to successfull control foaming and aid in stabilizing the sizing emulsion. The surfactant is utilized in any amount that effectively maintains the emulsion and prevents buildup of solids on the applicator apparatus.

An additional additive that may be present is one or more pigments. The pigment would be present in an effective amount to make the glass fibers blend with the color of any pigmented thermoplastic polymer. A nonexclusive example of such a pigment is carbon black that can be added in an aqueous dispersion.

Glass fiber strand mats can be provided from chopped and/or continuous glass fiber strands in the form of unstranded glass filaments, stranded glass filaments and bundles of glass fibers. A plurality of the bundles of glass fibers are provided from a source which may be a bushing, a suitable wound package or some other convenient source thereof by means of a filament dispersing and mat forming machine such as a Garnett-type machine coupled with suitable fiber or mat dispersing apparatus. A homogenous mat of bundles of glass fibers is formed from such a source by operation of such machinery so that the filaments are free to move relative to each other. Various additional processing steps may be performed on the glass fibers before being formed into a mat. If desired, for example, the filaments may be crimped by any suitable apparatus known to those skilled in the art. Moreover the filamenting material may be produced by flame attenuating primary filaments into fine diameter, staple fiber forms. Also the filaments may be chopped to any desired staple length by use of a conventional chopping machine well known to those skilled in the art. In general, any desired processing that is not detrimental to ultimately producing a uniform mat of bundles of glass fibers that are free to move relative to each other may be employed. It makes no difference if such processing is performed prior to, during, or subsequent to initial formation of the mat. After initial formation of the mat of uniformly dispersed bundles of glass fibers, it has been found desirable to provide the mat with sufficient integrity to maintain the achieved uniformity in fiber distribution during subsequent processing or handling. For this purpose it has been found most desirable to needle the mat in a conventional needle loom using barbed needles. Thereafter the mat is gathered by winding into a roll for subsequent use or cut to desired lengths or passed on for further processing. A particularly useful mat of glass fiber strands for use in reinforcing thermoplastic polymers is a needled continuous glass fiber strand mat.

The aqueous treating composition is used to treat glass fibers in any method known by those skilled in the art. The treated glass fibers can be in the form of continuous strands of glass fibers, continuous glass fibers or chopped fiber strands. These treated materials are used to produce mat by any method known to those skilled in the art. When the mat is composed of continuous glass fiber strands, a direct method can include attenuation of the glass fibers directly from a bushing in a glass melting furnace. In an indirect method the mat is produced from continuous glass fiber strands provided from packages of continuous glass fiber strands, the packages before being used to produce the mat can be dried. A nonexclusive example of treating glass fibers with the aqueous treating composition is a process illustrated in FIG. 2 of U.S. Pat. No. 3,849,148 which is hereby incorporated by reference. Glass fiber filaments emerge from orifices of an electrically heated bushing while being attenuated by means of a strand pulling device in both the direct and indirect methods of producing mats. These filaments are gathered to form a strand of glass fibers, which may comprise numerous individual fibers. The sizing is applied to the fibers by a conventional size applicator such as a kiss applicator or a belt applicator device. Details of a sizing applicator is shown in U.S. Pat. No. 2,728,972. Filaments after exiting the bushing are cooled by air or preferably by water. The filaments are gathered into bundles by gathering shoe and are then led to a strand pulling device such as illustrated in U.S. Pat. No. 3,292,013 as well as in the above referenced U.S. Pat. No. 3,849,148. In the indirect method the glass fiber strand or strands, if the filament exiting from the bushing have been separated into several strands, are then wound onto a forming tube on a collet rotating at approximately 7500 rpm to produce a strand travel of approximately 1200 to 1500 feet per minute. The glass fiber strand forming packages are then dried to a moisture content of around 2 to 10%, preferably 4 to 5%. Generally a curing temperature for the instant size is from around ambient to 140°–150° F.

In the indirect method a plurality of forming packages are used in forming a thermoplastic composite article by arranging the plurality of forming packages so that the strands may be drawn from the packages and laid down to form a mat of fibers, which may be chopped or continuous fibers, such as disclosed in U.S. Pat. No. 3,883,333 or U.S. Pat. No. 3,644,909. The continuous strand mat may be needled and combined or impregnated with the thermoplastic polymer to form a laminate with the thermoplastic polymer to form reinforced thermoplastic articles. The thermoplastic polymer can be polyolefins, polyamides, polyalkylene terephthalate and the like. The reinforced thermoplastic articles are then heated to the softening temperature of the matrix polymer and under pressure for a period of time of around 5 to about 20 minutes to bind the sized glass fiber strand mat to the thermoplastic resin. The laminated thermoplastic glass fiber mat articles may then be stamped or molded by a variety of means, including that of U.S. Pat. No. 3,884,909 hereby incorporated by reference to produce reinforced thermoplastic laminates suitable for use as containers or for other low cost, high strength uses.

Other types of thermoplastic polymers that can be used in the composite with the glass mat include chemically coupled polypropylene, polypropylenes with small amounts of polyethylenes and homopolymeric and copolymeric substances such as (1) vinyl resins formed by the polymerization of vinyl halides or by the copolymerization of vinyl halides with unsaturated polymerizable compounds e.g., vinyl esters; alpha, beta-unsaturated acids, alpha, beta-unsaturated esters, alpha, beta-unsaturated ketones, alpha, beta-unsaturated aldehydes and unsaturated hydrocarbons such as butadienes and styrenes; (2) poly-alpha-olefins such as polyethylene, polypropylene, polybutylene, polyisoprene and the like, including copolymers of poly-alpha-olefins; (3) phenoxy resins; (4) polyamides such as polyhexamethylene adipamide, poly-alpha-caprolactam and the like, including copolymers of polyamides; (5) polysulfones; (6) polycarbonates; (7) polyacetals; (8) polyethylene oxide; (9) polystyrene, including copolymers of styrene with monomeric compounds such as acrylonitrile and butadiene; (10) acrylic resins as exemplified by the polymers of methyl acrylate, acrylamide, methylol acrylamide, acrylonitrile and copolymers of these with styrene, vinyl pyridines, etc,; (11) neoprene; (12) polyphenylene oxide resins; and (13) cellulose esters including the nitrate, acetate, propionate, etc. This list is not meant to be limiting or exhaustive but merely to illustrate the wide range of polymeric materials which may be employed in the present invention.

PREFERRED EMBODIMENT

The aqueous treating composition preferred for use in the present invention is the aqueous treating composition disclosed in U.S. Pat. No. 3,849,148 wherein a polyvinylacetate film former is used in addition to the heat stable organic peroxide, nonionic surfactant, lubricant and combination of vinyl-containing-organic silane, coupling agent; and saturated amino-organic-silane coupling agent. Preferably the aqueous treating composition has a total solids in the range of about 1 to about 20 and more preferably about 2 to about 10 weight percent of the aqueous treating composition.

The aqueous sizing composition generally contains about 99% to about 80% water. It is preferred to use a kiss roll applicator to have between 88 and 98 parts by weight water in the aqueous sizing solution. Thus, solids amount is greatly dependent upon the applicator that is used to size the glass fiber strands.

In this aqueous treating composition it is preferred to use the vinyl tris(2-methoxy-ethoxy) silane and the gamma amino propyl triethoxysilane wherein the combined silanes are present in the range of about 0.5 to about 10 weight percent of the aqueous treating composition and preferably about 15 to about 25 weight percent of this amount is the gamma amino propyl triethoxysilane.

The aqueous treating composition is preferably prepared in the following manner. The vinyl-containing silane coupling agent preferably the vinyl tris(beta methoxy ethoxy) silane, and lubricant are disolved in about 75 percent of the water to be used in making the aqueous treating composition in a main mix vessel after the pH is adjusted to about 4 by the addition of acetic acid. It is also preferred to add the lubricant to hot water in a pre-mix vessel before it is added to the main mix vessel with the vinyl-containing organic silane coupling agent. This addition is with continuous agitation. The gamma-amino propyl triethoxysilane is added to the main mix tank preferably in an amount of about 20 weight percent of the vinyl-containing silane coupling agent added to the main mix tank. The amount of the vinyl-containing silane coupling agent is preferably around 3 to about 6 of the aqueous treating composition. Preferably an amount of around 1.5 to about 5 weight percent of polyvinylacetate homopolymer is added to the main mix tank. A particularly useful polyvinylacetate homopolymer is that available from National Starch under the trade designation Resyn NS25-1031 material which is a 54% solids emulsion of vinylacetate homopolymer. An amount of octyl phenoxy polyethyoxy ethanol nonionic surfactant with an HLB of 13.5 is added to the main mix tank in an amount of at least 1.25 weight percent to about 7.6 weight percent of the aqueous treating composition and preferably about 4 to about 6.5 weight percent of the aqueous treating composition. A particularly useful nonionic surfactant is available from Rohm and Haas Company under the trade designation Triton X-100 surfactant.

In addition it is preferred to add a softening agent to the aqueous treating composition in an amount of 0.01 to 1 weight percent of the aqueous treating composition. A particularly suitable softening agent is a 50/50 anionic-cationic methylsulfate quaternary fatty ester. A particularly suitable softening agent is that available from American Color and Chemical Company under the trade designation Amasoft PM softener. The softener may be any material that softens the strand, modifies drape, decreases the scrupiness of the fibers and contributes lubricity such that the fibers and strands may be successfully needled in the mat without excessive fiber breakage. Other types of softeners that can be used are the polyethylene-imine derivatives such as disclosed in U.S. Pat. No. 3,597,265 as they give good drape and result in a mat that needles well.

The aqueous treating composition is used to treat continuous glass fiber strands that are made into forming packages of glass fiber strands. The amount of the sizing used on the glass may be any amount which results in good structural strength of the finished thermoplastic reinforced laminate, good fiber integrity and handleability. A suitable amount of the sizing is about 0.02 to about 1 percent by weight sizing solids to total weight of the sized strand of glass. A preferred range is about 0.1 to about 0.6 percent to give good fiber integrity and handle-ability. A plurality of the preferably dried forming packages are mounted on a creel threaded through a feeder device for pulling the plurality of strands and dispersing them onto a moving conveyor belt as the feeder traverses the moving conveyor belt. This operation produces a continuous glass fiber strand mat. The continuous mat is then needled wherein the presence of the dried residue of the aqueous treating composition permits the use of less penetration of the needles into the mat and/or the use of smaller diameter needles to make the glass mat more flowable when combined with thermoplastic polymer to produce a laminate which is then stamped. The stamped article has a more homogenous distribution of glass mat and polymer and fewer void spaces than articles that utilize glass mat made with conventional aqueous sizing compositions with the same amount of needling.

The dried sized glass fiber strands are preferably used to reinforce polyolefin polymers including polyethylene and 5-methylpentene polymers. A preferred polyolefinic polymer for utilization with the instant sized glass fiber strand is polypropylene which includes chemically coupleable polypropylene since this polymer binds very well with the instant sizing composition and it is relatively low cost and gives good strength properties when reinforced with glass fibers. The ratio of polyolefin polymer to glass may be selected in any ratio that gives the desired properties to the finished article. Generally a ratio of about 10 to about 60 percent by weight is suitable. A preferred amount is about 35 to about 45 percent by weight glass in a polypropylene molded article to give a good balance of cost, properties and structural strength.

The following examples further elucidate the present invention.

EXAMPLE I

An aqueous treating composition was prepared in accordance with the method disclosed in the Preferred Embodiment and the composition had the following formulation.

EXAMPLE 1

| Ingredient | | | |
|---|---|---|---|
| Functional Identification | Chemical Identification | Weight | Parts by Weight Percent |
| Coupling Agent (1) | Vinyl tris (beta methoxy ethoxysilane | 17.46 kg | 4.6 |
| Coupling Agent (2) | Gamma-amino propyltriethoxysilane | 4.36 kg | 1.2 |
| pH Control | Acetic Acid | .86 kg | .2 |
| Free Radical Initiator | 2,2' bix (t-butyl peroxyisopropyl benzene | 12.92 kg | 3.4 |
| Non-Ionic Surfactant | Octyl phenoxy polyethoxyethanol | 2.15 kg | .6 |
| Lubricant | Emerylube (Sold by Emery Industries) a cationic active acid solubilized, fatty acid amide | 0.14 kg | .03 |
| Film former | polyvinylacetate (54% solids) | 11.49 kg | 3.0 |
| Water | | 329.61 kg | 86.6 |
| Total weight | | 380.87 kg | |

EXAMPLE 2

Another aqueous treating composition was prepared having the following formulations without an increased amount of the nonionic surfactant.

EXAMPLE II

| Ingredient | | | |
|---|---|---|---|
| Functional Identification | Chemical Identification | Weight | Parts by Weight Percent |
| Coupling Agent (1) | Vinyl tris (beta methoxy ethoxysilane | 17.46 kg | 4.6 |
| Coupling Agent (2) | Gamma-amino propyltriethoxysilane | 4.36 kg | 1.2 |
| pH Control | Acetic Acid | .86 | .2 |
| Free Radical Initiator | 2,2'bis (t-butyl peroxyisopropyl benzene | 12.92 kg | 3.4 |
| Non-Ionic Surfactant | Octyl phenoxy polyethoxyethanol | 1.72 kg | .4 |
| Lubricant | Emerylube (Sold by Emery Industries) a cationic active acid solubilized, fatty acid amide | 0.14 kg | .03 |
| Film former | polyvinylacetate (54% solids) | 11.49 kg | 3.0 |
| Water | | 329.61 kg | 86.6 |
| Total weight | | 380.44 kg | |

Illustrative Example

An aqueous treating composition was prepared without the use of the partial substitution of gamma-aminopropyltriethoxysilane for the vinyltris(betamethoxyethoxy) silane and had the following formulation:

ILLUSTRATIVE EXAMPLE

| Ingredient | | | |
|---|---|---|---|
| Functional Identification | Chemical Identification | Weight | Parts by Weight Percent |
| Coupling Agent | Vinyl tris (beta methoxy ethoxysilane | 21.8 kg | 0.6 |
| pH Control | Acetic Acid | | |
| Free Radical Initiator | 2,2' bis (t-butyl peroxyisopropyl benzene | 12.92 kg | 0.34 |
| Non-Ionic Surfactant | Octyl phenoxy polyethoxyethanol | 1.72 kg | 0.04 |
| Lubricant | Emerylube (Sold by Emery Industries) a cationic active acid solubilized, fatty acid amide | 0.14 kg | 0.003 |
| Film former | polyvinylacetate (54% solids) | 11.49 kg | 0.3 |
| Water | | 329.61 kg | 98.3 |
| Total weight | | 380.4 kg | |

The three aqueous treating compositions of Example 1, 2 and the illustrative example were used to treat glass fiber strand in the method disclosed in the specification. Forming packages of the treated glass fiber strands were then dried, mounted on a creel and used to make continuous glass fiber strand mat that was needled and combined with polypropylene to produce a laminate article. The article was then heated to the softening point of the polypropylene and placed in a mold and stamped. Data from this operation are presented in Table I. The data show that the presence of the saturated amino organic silane coupling agent in conjunction with the vinyl-containing silane with and without additional amounts of the nonionic surfactant lowered the tensile strength properties and the loft of the glass fiber strand mat to produce a more flowable glass mat. The more flowable glass mat, when combined with the thermoplastic polymer to produce a laminate that is heated and stamped, yields similar stamp tonages as the stamped article utilizing a conventional aqueous sizing composition. The lower Izod impact values for the stamped articles confirms the improved flowability of the glass mat of the present invention.

TABLE I

Data on Forming of Treated Glass Fibers, and Production of Mat and Polypropylene Composite Article

| Example No. | Aqueous Composition | Treated Strand Construction | FORMING Binder Solids (%) | LOI | MAT PRODUCTION Tensile (psi × 10³) | Loft | COMPOSITE PRODUCTION Glass Content (%) | Void Content | Flexural Strength (psi) | Flexural Modulus psi × 10⁶ | Stamp Tonnage | Izod Impact |
|---|---|---|---|---|---|---|---|---|---|---|---|---|
| 1 | 1 | 4/5 | 4.4 | .4 | 11.2 | 7.3 | 37.9 | 6.0 | 18.2 | .69 | 60 | 11 |
| 2 | 1 | 4/5 | 4.4 | .4 | 8.3 | 7.4 | 32.8 | 4.1 | 16.7 | .64 | 50 | 11 |
| 3 | 2 | 4/5 | — | .46 | 9.8 | 4.3 | 46 | 3.8 | 20.2 | .82 | 75 | 10.2 |
| 4 | 1 | 4/5 | 4.4 | .40 | 9.3 | 5.4 | 43.6 | 3.6 | 20.9 | .75 | 75 | 11.2 |
| 5 | 1 | 4/5 | 4.4 | .40 | 9.4 | 4.9 | 35.9 | 4.7 | 21 | .76 | 65 | 8.0 |
| 6 | 1 | 4/5 | 4.4 | .40 | 9.3 | 5.4 | 43.6 | 3.6 | 20.9 | .75 | 75 | 11.8 |
| 7 | Illustrative Example (Values are average of 3 tests) | 4/5 4/5 | — | — | 16 | 6.2 | 39.7 | 4.3 | 19.8 | .72 | 55 | 14.8 |

I claim:

1. In a method of forming glass fibers that are gathered into strands including the steps of
   forming glass fibers from molten cones of glass at the tips of orifices in a bushing by attenuation;
   sizing said glass fibers with an aqueous sizing composition;
   gathering said fibers into one or more strands; and
   collecting one or more glass fiber strands, the Improvement comprising:
   sizing said glass fibers with an aqueous sizing composition comprising:
   a. a combination of two organic silane coupling agents in an amount of about 0.5 to about 10 weight percent of the aqueous sizing composition, wherein one organic silane coupling agent is a vinyl containing organic silane coupling agent in an amount of about 60 to about 99 weight percent of the amount of the combined silane coupling agents and the other is a saturated amino organic silane coupling agent present in an amount of about 1 to about 40 weight percent of the combined silane coupling agents,
   b. about 0.125 to about 7.6 percent by weight of a nonionic surfactant,
   c. about 0.001 to about 1 percent by weight of a glass fiber lubricant,
   d. about 0.1 to about 6 percent by weight of an organic peroxide free radical initiator having a half life exceeding 60 hours at 212° F. (100° C.) and 20 minutes at 300° F. (149° C.),
   e. about 0.5 to about 15 weight percent of a film forming polymer selected from the group consisting of polyvinylalcohol, polyvinylacetate, polyvinylpyrrolidone and vinyl acetatemetholacrylamide copolymers, and
   f. water in an amount to give a total solids in the range of about 1 to about 20 weight percent.

2. Method of claim 1 wherein the vinyl-containing silane coupling agent is selected from the group consisting of vinyl-tris-(bethamethoxyethoxy) silane, vinyl triethoxysilane, gammamethacryloxy propyl trimethoxysilane, vinyltri-acetoxysilane.

3. Method of claim 1 wherein the saturated amino silane coupling agent is selected from gamma aminopropyl triethoxy silane, N-beta-(amino ethyl), gamma aminopropyl trimethoxysilane and the amino functional silane having the structural formula

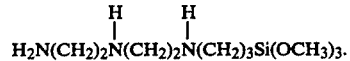

4. Method of claim 1 wherein the nonionic surfactant is octylphenoxy polyethyoxy ethanol.

5. Method of claim 1 wherein the softening agent is a 50/50 anionic-cationic methyl sulfate quaternary salt of a fatty acid.

6. Glass fiber strands produced by the method of claim 1.

7. A needled continuous glass fiber strand mat prepared from the glass fiber strands of claim 6.

8. Glass mat reinforced thermoplastic article having the mat of claim 7 combined with an overlay and underlay of thermoplastic polymer wherein the combination is heated under pressure to produce the article.

9. Article of claim 8 wherein the thermoplastic polymer is polypropylene or chemically coupled polypropylene.

10. Method of claim 1 wherein there is present an effective amount of pigment.

11. A needled mat of glass fiber strands for use in reinforcing thermoplastic polymers to give the reinforced thermoplastic polymers improved stampability, where the needled mat is comprised of:
   a. a plurality of glass fiber strands distributed in a mat structure where the mat has sufficient integrity provided by needling, and
   b. a coating on a substantial portion of the surface of the glass fibers in the strands, wherein the coating is of an aqueous sizing composition comprising:
   (a) a combination of organic silane coupling agents present in the aqueous treating composition in an amount of about 0.5 to about 10 percent by weight, wherein one silane is a vinyl-containing organic silane coupling agent present in an amount of about 60 to about 99 weight percent of the combined silanes and another silane coupling agent is a saturated amino-organic silane coupling agent in an amount in the range of about 1 to about 40 weight percent of the combined silanes,
   (b) about 0.5 to about 15 percent by weight of a film forming polymer selected from the group consisting of polyvinylalcohol, polyvinylacetate, polyvinylpyrrolidone and vinylacetatemetholacrylamide copolymers, (c) about 0.125 to about 7.6 percent by weight of a nonionic surfactant, (d) about 0.001 to about 1 percent by weight of a glass fiber lubricant, (e) about 0.1 to about 6 percent by weight of a heat stable organic peroxide free radical initiator, and (f) an amount of water to give a total solids for the composition in the range of about 1 to about 20 weight percent.

12. Mat of claim 11 wherein the amount of saturated amino organic silane coupling agent is around 15 to 25 weight percent of the weight of the combined silane coupling agents.

13. Mat of claim 11 where the film forming polymer is present in an amount of about 0.5 to about 8 weight percent.

14. Mat of claim 13 wherein the film forming polymer is a polyvinylacetate homopolymer.

15. Mat of claim 11 which includes an effective amount of a softener.

16. Mat of claim 14 wherein the effective amount of softener is in the range of about 0.1 to about 1 weight percent of the aqueous treating composition.

17. Mat of claim 11 or 12 wherein the softener is a 50/50 anionic-cationic methylsulfate quaternary fatty ester compound.

18. Mat of claim 11 wherein the nonionic surfactant is an octyl phenoxy polyethyoxy ethanol having an HLB of 13.5.

19. Mat of claim 11 that has needled continuous glass fiber strands.

20. Mat of claim 11 that has continuous glass fiber strands.

21. Mat of claim 11 that has chopped glass fiber strand.

22. Needled glass fiber strand mat of claim 11 wherein the thermoplastic polymers are selected from the group consisting of polyolefins including chemically coupled polyolefins, nylons, and polyalkylene terephthalates.

23. Thermoplastic laminate reinforced with needled glass fiber strand mat having improved stampability, where the laminate is produced by combining the needled glass fiber strand mat with an overlay and underlay of the thermoplastic polymer and the combination is heated under pressure, comprising:

a. needled glass fiber strand mat, wherein the glass fibers have a coating of a dried residue having around 2 to 10 percent moisture content, where the dried residue is of an aqueous sizing composition, comprising:

(a) a combination of organic silane coupling agents present in the aqueous treating composition in an amount of about 0.5 to about 10 percent by weight, wherein one silane is a vinyl-containing organic silane coupling agent present in an amount of about 60 to about 99 weight percent of the combined silanes and another silane coupling agent is a saturated amino-organic silane coupling agent in an amount in the range of about 1 to about 40 weight percent of the combined silanes, (b) about 0.5 to about 15 percent by weight of a film forming polymer selected from the group consisting of polyvinylalcohol, polyvinylacetate, polyvinylpyrrolidone, and vinylacetatemethacrylamide copolymers, (c) about 0.1 to about 7.6 percent by weight of a nonionic surfactant, (d) about 0.001 to about 1 percent by weight of a glass fiber lubricant, (e) about 0.1 to about 6 percent by weight of a heat stable organic peroxide free radical initiator, and (f) an amount of water to give a total solids in the range of about 1 to about 20 weight percent, b. thermoplastic polymer selected from the group consisting of polyolefins, polyamides, polyalkylene terephthalate chemically coupling polypropylene, polypropylenes with small amounts of polyethylenes and homopolymeric and copolymeric substances such as (1) vinyl resins formed by the polymerization of vinyl halides or by the copolymerization of vinyl halides with unsaturated polymerizable compounds, e.g. vinyl esters; alpha, beta-unsaturated acids; alpha, beta-unsaturated esters; alpha, beta-unsaturated ketones; alpha, beta-unsaturated aldehydes; and unsaturated hydrocarbons such as butadienes and styrenes; (2) polyalpha-olefins such as polyethylene, polypropylene, polybutylene, polyisoprene and the like, including copolymers of polyalpha-olefins; (3) phenoxy resins; (4) poly amides such as polyhexamethylene adipamide, polyalphacaprolactam and the like, including copolymers of polyamides; (5) polysulfones; (6) polycarbonates; (7) polyacetals; (8) polyethylene oxide; (9) polystyrene, including copolymers of styrene with monomeric compounds such as acrylonitrile and butadiene; (10) acrylic resins as exemplified by the polymers of methyl acrylate, acrylamide, methylol acrylamide, acrylonitrile and copolymers of these with styrene, vinyl pyridines, ect.; (11) neoprene; (12) polyphenylene oxide resins; and (13) cellulose esters including the nitrate, acetate and propionate.

24. Method according to claim 1 wherein the sized glass fibers are dried to a moisture content of around 2 to 10 percent.

25. Needled mat of claim 11 wherein the coated glass fiber strands have a moisture content of about 2 to 10 percent.

26. Reinforced thermoplastic polymeric article prepared from the mat of claim 11 combined with an overlay and underlay of thermoplastic polymer and heated under pressure to place these components in close association.

27. The thermoplastic laminate of claim 23, wherein the film forming polymer is a polyvinylacetate homopolymer.

28. A method of forming needled mat of glass fiber strands for use in reinforcing thermoplastic polymers to give the reinforced thermoplastic polymer improved stampability, comprising:

a. forming glass fibers from molten cones of glass at the tips of orifices in a bushing by attenuation;

b. sizing said glass fibers with an aqueous sizing composition having:

(i) a combination of two organic silane coupling agents in an amount of about 0.5 to about 10 weight percent of the aqueous sizing composition, wherein one organic silane coupling agent is a vinyl-containing organic silane coupling agent in an amount of about 60 to about 99 weight percent of the amount of the combined silane coupling agents, and wherein the other is a saturated amino organic silane coupling agent present in an amount of about 1 to about 40 weight percent of the combined silane coupling agents, (ii) about 0.125 to about 7.6 percent by weight of a nonionic surfactant, (iii) about 0.001 to about 1 percent by weight of a glass fiber lubricant, (iv) about 0.1 to about 6 percent by weight of an organic peroxide free radical initiator having a half life exceeding 60 hours at 212° F. (100° C.) and 20 minutes at 300° F. (149° C.), (v) about 0.5 to about 15 weight percent of a film forming polymer, and (vi) water in an amount to give a total solids for the sizing composition in the range from about 1 to about 20 weight percent;

c. gathering said fibers into one or more strands;

d. collecting said glass fiber strands;

e. dispersing a plurality of the glass fiber strands onto a moving conveyor belt to form a continuous glass fiber strand mat, f. needling the continuous strand mat is a needle loom using barbed needles, wherein the presence of the treating composition on the glass fibers permits the use of less penetration by the needles into the mat and/or the use of smaller diameter needles to make the needled glass fiber strand mat more flowable when combined with thermoplastic polymer to produce a laminate which has improved stampability.

29. Method of claim 28, wherein the strands are collected into a forming package and a plurality of the forming packages are dried so that the dried glass fiber strand has a moisture content of around 2 to about 10 weight percent and a plurality of the dried forming packages are used to provide the plurality of glass fiber strands for dispersing onto a moving conveyor to form a continuous mat.

30. Method of claims 1 or 28, wherein the aqueous size has present about 0.1 to about 1 weight percent of a softening agent.

* * * * *